Sept. 15, 1953  E. C. ELSNER  2,651,824
ROPE AND CABLE JOINT
Filed Sept. 15, 1950
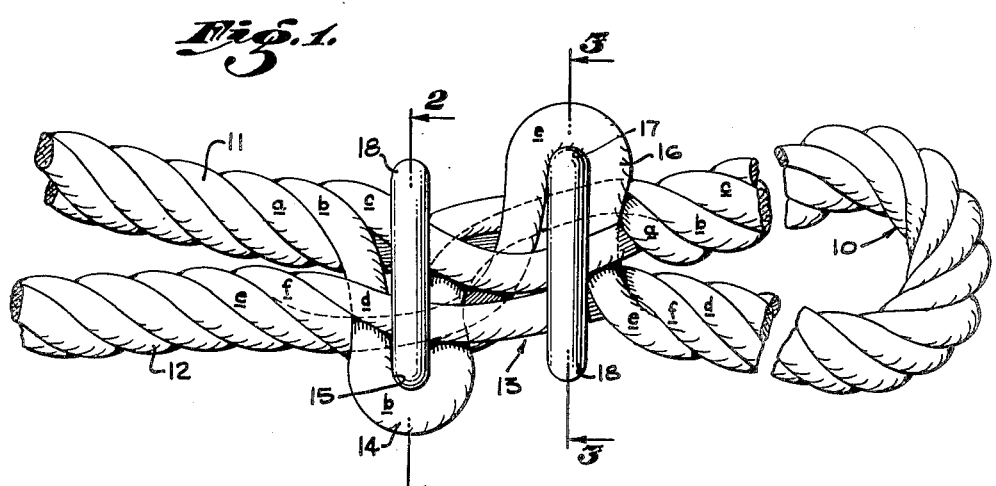
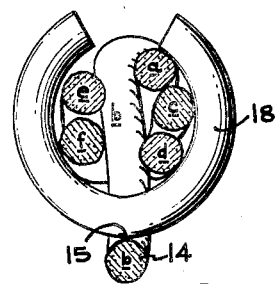
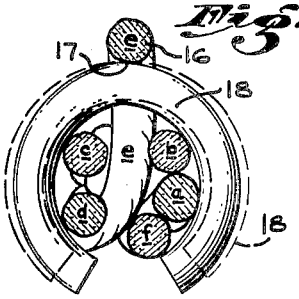
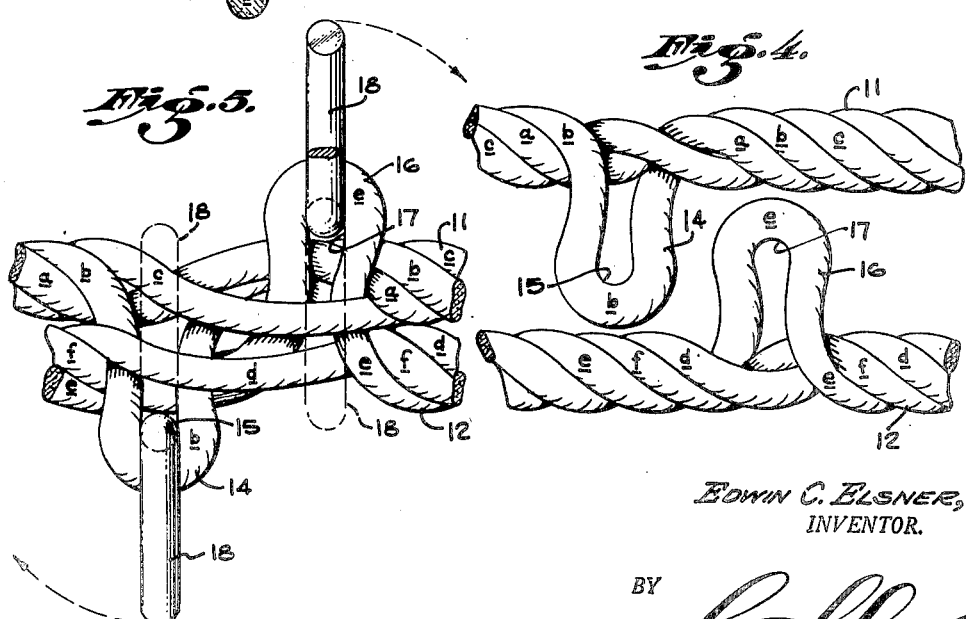
EDWIN C. ELSNER,
INVENTOR.
BY
ATTORNEY Patented Sept. 15, 1953

2,651,824

UNITED STATES PATENT OFFICE 2,651,824

ROPE AND CABLE JOINT

Edwin C. Elsner, Glendale, Calif.

Application September 15, 1950, Serial No. 185,125

7 Claims. (Cl. 24—122.6)

The present invention relates generally to joint or fastening means; and is more particularly concerned with means for interconnecting adjacently disposed sections of elongate flexible members, such as ropes and cables.

The present invention is particularly efficacious in the fabrication of cargo nets, cargo slings and other devices of similar nature made from ropes and cables. Heretofore in the making of such devices, the loops or meshes were formed by cutting and splicing rope sections, or by interweaving one section through other sections. These operations required the services of somewhat skilled artisans trained in rope and cable work, and the construction of each device necessitated the expenditure of relatively long period of time.

In accordance with the general concepts of the present invention, it is sought as one object to provide a strong joint between rope sections of simple but strong construction, which does not require the use of skilled labor, nor the interweaving or splicing of the sections, and which will when completed retain the sections against separation and slippage.

A further object is to provide a joint which may be utilized between rope sections without the necessity of cutting or splicing, and which is so constructed that it may subsequently be taken apart without damage to the joined parts.

Still another object is to provide a joint for rope and cable sections which may be generally applied and utilized in the fabrication of various articles such as nets, slings and the like.

Still another object is to provide an improved method for joining rope sections, which may be practiced in the construction of a joint embodying the inherent features and advantages described herein.

In brief, adjacently positioned rope sections may be joined according to the present invention by the simple expedient of forming a strand in one section into a loop which is extended laterally and positioned between strands of the adjacent rope section to which it is to be connected. The loop is so placed that the eye of the loop projects beyond the periphery of the other section, so that a retaining member such as a split open ended ring may be passed through the eye of the loop and this ring clamped around the connected sections so as to grip these sections and cooperate with the anchored loop portions to hold the connected sections against separation and slipping.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is an elevational view of a joint according to the present invention, the joint being incorporated in a device such as a cargo sling;

Fig. 2 is a transverse section through the joint, taken substantially on line 2—2 of Fig. 1;

Fig. 3 is a similar sectional view, taken substantially on line 3—3 of Fig. 1;

Fig. 4 is an expanded view illustrating a pair of rope sections to be joined, and showing the formation of the strand loop portions in their initial relative positions; and Fig. 5 is a view progressively illustrating the manner in which the loop portions are extended between the strands of the adjacent other section, and the initial position of the binding ring.

Referring now to the drawings, for purposes of illustration, there is shown in Fig. 1 a device fabricated from a rope or cable, wherein a loop has been formed as indicated at 10 by securing adjacently positioned rope sections 11 and 12 together in a joint, as generally indicated at 13, embodying the features of the present invention. Although the joint in the present instance is used to form a loop, the joint is generally applicable for use in different types of rope structure, for example, for joining rope sections so as to fabricate therefrom a cargo net, or the like.

As shown in Fig. 4, the rope section 11 is made up of twisted strands, in this instance the three strands a, b and c. The rope or cable section 12 is made up of the three strands d, e and f. As an initial step in forming the joint of the present invention, a strand of the two sections to be joined is pulled out laterally and formed into a loop. As shown, the strand b of the rope section 11 is pulled out and formed into a laterally projecting loop portion 14 which defines a loop eye 15. Correspondingly, the strand e of the section 12 is pulled out laterally to form a loop portion 16 defining a loop eye 17.

The loop portions 14 and 16 are then positioned in oppositely extending directions as shown in Fig. 4, and each loop portion is pulled through between the strands of the other associated section, as shown in Fig. 5. More specifically, the loop portion 16 is positioned between the strands a and c of section 11, and drawn through so as to project beyond its periphery and expose the loop eye 17 thereof. The loop portion 14 of rope section 11 is positioned between the strands d and f of rope section 12 and pulled therethrough until the loop portion 14 projects beyond the periphery of section 12 and the loop eye 15 is exposed.

From the foregoing, it will be observed that strands of the two rope sections 11 and 12 are interconnected with loop strands, but that unless some means are provided for anchoring these loop portions, they will pull out immediately upon subjecting the rope sections to stress. The loop portions are anchored against removal by means of split or open end rings 18 which are initially of cylindrical or substantially cylindrical configuration with their ends spaced apart sufficiently to permit the lateral passage therethrough of the particular size rope sections with which they are utilized, and are of sufficient diameter to receive two rope sections therein.

The rings 18 are initially threaded through the respective loop eyes 15 and 17 and positioned with their entrance openings facing outwardly in opposite direction away from the associated sections 11 and 12, as shown in Fig. 5. As thus positioned, the rings 18 will prevent retraction of the loop portions 14 and 16, and will thus anchor the loops so that a stress may be applied to the rope sections.

In order to complete the joint, the rings 18 are respectively rotated to their dotted line positions as shown in Fig. 5, so as to encompass and extend around both sections 11 and 12 in each case. The rings will thus occupy positions as shown by dotted lines in Fig. 3. The joint is then completed by deforming the rings 18 to bring their separated ends more closely together, as shown in full lines in Fig. 3, so as to clampingly engage the strands of both rope sections 11 and 12 and retain these sections against lateral separation.

From the foregoing description, it will be appreciated that the joint described provides a unique connection between adjacently disposed rope sections, which will efficiently retain the sections against separation and relative slipping due to the interlocking of strands and the clamping engagement of the sections by means of the ring members 18. Moreover, if it should subsequently be desired to disassemble a joint, this may be quickly and readily accomplished without damaging the strands of the rope sections. The utilization of the joint of the present invention, eliminates the usual cutting, weaving or splicing of the rope sections and permits placing the joint at any desired location without the necessity of having to obtain more or less skilled riggers or artisans to make the joint.

I claim:

1. A joint for connecting adjacently disposed elongate flexible stranded members, comprising: a laterally extending loop formed from a strand of each member, the loop of each of the adjacently disposed members being positioned between strands of the other member and projecting therethrough; and a split ring of deformable material extending through each projecting loop, the ends of each ring being initially spaced apart sufficiently to receive the members sidewise therethrough upon swinging movement of the ring from a position extending beyond the associated loop to an opposite position around the adjacent members, and in the latter position being deformable into gripped relation with said members.

2. A joint for connecting adjacently disposed elongate flexible stranded members, comprising: a laterally extending loop formed from a strand of each member, the loop of each adjacently disposed member being positioned between strands of the other member and projecting therethrough; and split binding rings gripped around the adjacent members at spaced position longitudinally thereof, each of said rings extending through a projecting loop.

3. A joint for connecting adjacently disposed elongate flexible members, comprising: a looped portion of one of said members extending between adjacent portions of said other member and projecting therefrom to form a loop eye; and deformed binding means securing said adjacent members against separation, said binding means extending through said loop eye to anchor said looped portion against removal.

4. A joint for connecting adjacently disposed ropes, comprising: a looped portion formed in each of said ropes, each of said loops overlying a portion of an adjacent rope; and binding means extending through said loops and around said ropes to secure them against separation.

5. In a rope article of manufacture: adjacently disposed rope sections, a strand of each section being formed into a laterally extending loop engaged between strands of an adjacent section and having its eye portion projecting beyond the periphery of said adjacent section; and a metal binding member extending through said loop eye clamped around said adjacent sections, whereby said loops are anchored and the adjacent sections secured against separation and longitudinal slipping.

6. In a rope article of manufacture: adjacently disposed rope sections, a strand of each section being formed into a laterally extending loop engaged between strands of an adjacent section and having its eye portion projecting beyond the periphery of said adjacent section; and a member extending through said loop eye clamped around said adjacent sections, whereby said loops are anchored and the adjacent sections secured against separation and longitudinal slipping.

7. In a rope article of manufacture: adjacently disposed rope sections, a strand of one section being formed into a laterally extending loop engaged between strands of an adjacent section and having its eye portion projecting beyond the periphery of said adjacent section; and a member extending through said loop eye clamped around said adjacent sections, whereby said loops are anchored and the adjacent sections secured against separation and longitudinal slipping.

EDWIN C. ELSNER.

References Cited in the file of this patent

UNITED STATES PATENTS

| Number | Name | Date |
|---|---|---|
| 599,173 | Gardner | Feb. 15, 1898 |
| 876,572 | Melland et al. | Jan. 14, 1908 |
| 1,334,244 | Howe | Mar. 16, 1920 |
| 2,461,079 | Peterson | Feb. 8, 1949 |